United States Patent
Han et al.

(10) Patent No.: US 7,497,899 B2
(45) Date of Patent: Mar. 3, 2009

(54) CYCLONE DUST COLLECTING APPARATUS

(75) Inventors: Jung-Gyun Han, Busan (KR); Jang-Keun Oh, Gwanju (KR); Ji-Won Seo, Jeonrabuk-Do (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 528 days.

(21) Appl. No.: 11/072,939

(22) Filed: Mar. 4, 2005

(65) Prior Publication Data

US 2006/0059871 A1    Mar. 23, 2006

(30) Foreign Application Priority Data

Sep. 21, 2004    (KR)    ............... 10-2004-0075370

(51) Int. Cl.
*B01D 45/12*    (2006.01)
*B03C 3/41*    (2006.01)

(52) U.S. Cl. .................... 96/95; 55/343; 55/349; 55/429; 55/459.1

(58) Field of Classification Search ........... 55/315, 55/318, 343, 349, 429, 459.1; 96/95
See application file for complete search history.

(56) References Cited

U.S. PATENT DOCUMENTS

| 1,416,995 | A | * | 5/1922 | Stroud | ............. | 55/343 |
| 3,425,192 | A |   | 2/1969 | Davis |  |  |
| 4,017,390 | A |   | 4/1977 | Vicard | ............. | 210/42 R |
| 6,383,266 | B1 |   | 5/2002 | Conrad et al. | ........... | 96/57 |
| 6,740,144 | B2 |   | 5/2004 | Conrad et al. | ........... | 96/57 |
| 7,128,770 | B2 | * | 10/2006 | Oh et al. | ............. | 55/343 |

FOREIGN PATENT DOCUMENTS

| CA | 2067388 |    | 8/1991 |
| DE | 1101369 |    | 3/1961 |
| DE | 3121935 | A1 * | 6/1982 |
| DE | 3723153 |    | 7/1987 |
| DE | 3723153 |    | 1/1989 |
| GB | 2005628 |    | 8/1979 |
| GB | 2055628 |    | 3/1981 |
| GB | 896182 |    | 11/1992 |
| GB | 2352657 |    | 2/2001 |
| JP | 3821684 |    | 10/1938 |
| JP | 39-4983 |    | 10/1962 |
| JP | 52-014775 |    | 7/1975 |
| JP | 5704356 |    | 3/1982 |

(Continued)

OTHER PUBLICATIONS

British Combined Search and Examination Report dated Aug. 30, 2005 corresponding to British Application No. 05099294.5.

(Continued)

*Primary Examiner*—Robert A Hopkins
(74) *Attorney, Agent, or Firm*—Ohlandt, Greeley, Ruggiero & Perle, LLP.

(57) ABSTRACT

A cyclone dust collecting apparatus comprises a first cyclone for centrifuging dust from drawn-in air; one or more second cyclones for separating dust from air which is passed through the first cyclone; and an electrode unit mounted to at least one of the first and the second cyclones.

13 Claims, 5 Drawing Sheets

FOREIGN PATENT DOCUMENTS

| | | |
|---|---|---|
| JP | 09-010625 | 1/1997 |
| JP | 2004-223462 | 8/2004 |
| KR | 102002-0079159 | 10/2002 |
| KR | 102003-0047609 | 6/2003 |
| SU | 994011 | 9/1979 |
| WO | WO9107230 | 5/1991 |
| WO | WO 9107230 A1 | 5/1991 |
| WO | WO 0040153 A1 | 7/2000 |

OTHER PUBLICATIONS

Official Action issued on Jan. 25, 2006 from the Russian Patent Office with respect to Russian Patent Application No. 2005111011 filed on Apr. 8, 2005.

English Translation of Official Action issued on Jan. 25, 2006 from the Russian Patent Office with respect to Russian Patent Application No. 2005111011 filed on Apr. 8, 2005.

Office Action dated Nov. 17, 2006 issued from the Chinese Patent Office with respect to Chinese Patent Application No. 200510056306.3 filed on Mar. 16, 2005 (w/ English translation).

Official Action dated Mar. 13, 2007 issued from Japanese Patent Office with respect to Japanese Patent Application No. 2005-45818.

Office Action dated Apr. 18, 2007 from German Patent Application No. 10 2005 014 541.8-15.

Japanese Office Action dated Jul. 17, 2007 corresponding to Japanese Patent Application No. 2005-45818.

* cited by examiner

CYCLONE DUST COLLECTING APPARATUS

CROSS-REFERENCE TO RELATED APPLICATIONS

This application claims the benefit of Korean Patent Application No. 2004-75370, filed Sep. 21, 2004, in the Korean Intellectual Property Office, the disclosure of which is incorporated herein by reference.

BACKGROUND OF THE INVENTION

1. Field of the Invention

The present invention relates to a vacuum cleaner. More particularly, the present invention relates to a cyclone dust collecting apparatus for separating impurities such as dust included in drawn-in air using a centrifugal force and electricity.

2. Description of the Related Art

A vacuum cleaner generally comprises a suction brush moving along a surface being cleaned and connected to a cleaner body, a dust collecting apparatus detachably mounted in the cleaner body and a motor for supplying a suction force. By the suction force generated by the motor, dust and assorted impurities on the surface being cleaned are drawn into the cleaner body and filtered by the dust collecting apparatus, and cleaned air is discharged to the outside of the vacuum cleaner through a motor.

Such a conventional dust collecting apparatus used to employ a dust bag and now applies a cyclone-type dust collecting apparatus which uses a centrifugal force to improve user's convenience and cleaning efficiency. Recently, a vacuum cleaner capable of enhancing the cleaning efficiency by having therein a plurality of cyclones provided in a serial or a parallel arrangement has been developed and domestically applied. However, the improved vacuum cleaner is still not enough yet to thoroughly collect fine dust included in the air. Therefore, researches are in progress to improve dust-collecting efficiency by catching and collecting even the fine dust which is hardly subject to the centrifugal force.

SUMMARY OF THE INVENTION

An aspect of the present invention is to solve at least the above problems and/or disadvantages and to provide at least the advantages described below. Accordingly, an aspect of the present invention is to provide a cyclone dust collecting apparatus capable of effectively collecting fine dust.

In order to achieve the above-described aspects of the present invention, there is provided a cyclone dust collecting apparatus comprising a first cyclone for centrifuging dust from drawn-in air; one or more second cyclones for separating dust from air which is passed through the first cyclone; and an electrode unit mounted to at least one of the first and the second cyclones.

The electrode unit comprises a first electrode mounted in a first discharge path of the first cyclone, and a first conductive member mounted to an inner wall of the first cyclone.

The electrode unit comprises a second electrode mounted in a second discharge path of the second cyclone, and a second conductive member mounted to an inner wall of the second cyclone.

The first and the second electrode members generate negative ions so that the dust included in the air is charged with negative electricity, and the first and the second conductive members are grounded.

Another aspect of the present invention is achieved by providing a cyclone dust collecting apparatus comprising a multi-cyclone unit including a first cyclone chamber for separating dust from drawn-in air and a plurality of second cyclone chambers formed around the first cyclone chamber; a cover unit mounted to a top portion of the multi-cyclone unit to connect the first and the second cyclone chambers; a dust collecting unit mounted to a bottom portion of the multi-cyclone unit to collect centrifuged dust; and an electrode unit for charging the dust drawn into at least one of the first and the second cyclone chambers.

The cover unit comprises a first cover having centrifugal paths for guiding the air, passed through the first cyclone chamber, to the second cyclone chamber in swirling manner and a second cover for guiding the air discharged from the second cyclone, and the electrode unit comprises at least one electrode members and at least one conductive members.

The electrode member comprises a first electrode member mounted to the first cover and projected into the first cyclone chamber and a plurality of second electrode members projected into the second cyclone chamber, and the conductive member comprises a first conductive member mounted to an inner wall of the cyclone body and a plurality of second conductive members mounted to inner walls of the plurality of second cyclone bodies.

The conductive member further comprises a third conductive member mounted on an inner wall of the first cover.

The first cover comprises first and second guide members formed in first and second discharge paths, and the first and the second electrode members are mounted to the first and the second guide members.

The first and the second guide members respectively have mounting holes for inserting therein the first and the second electrode members.

The first and the second electrode members generate negative ions, and the first and the second conductive members are grounded.

The first and the second electrode members are configured in a needle form.

The second electrode members are connected parallel one another so as to be respectively applied with the same voltage.

BRIEF DESCRIPTION OF THE DRAWING FIGURES

The above aspect and other features of the present invention will become more apparent by describing in detail exemplary embodiments thereof with reference to the attached drawing figures, wherein.

DETAILED DESCRIPTION OF THE EXEMPLARY EMBODIMENTS

Hereinafter, an embodiment of the present invention will be described in detail with reference to the accompanying drawing figures.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 1:
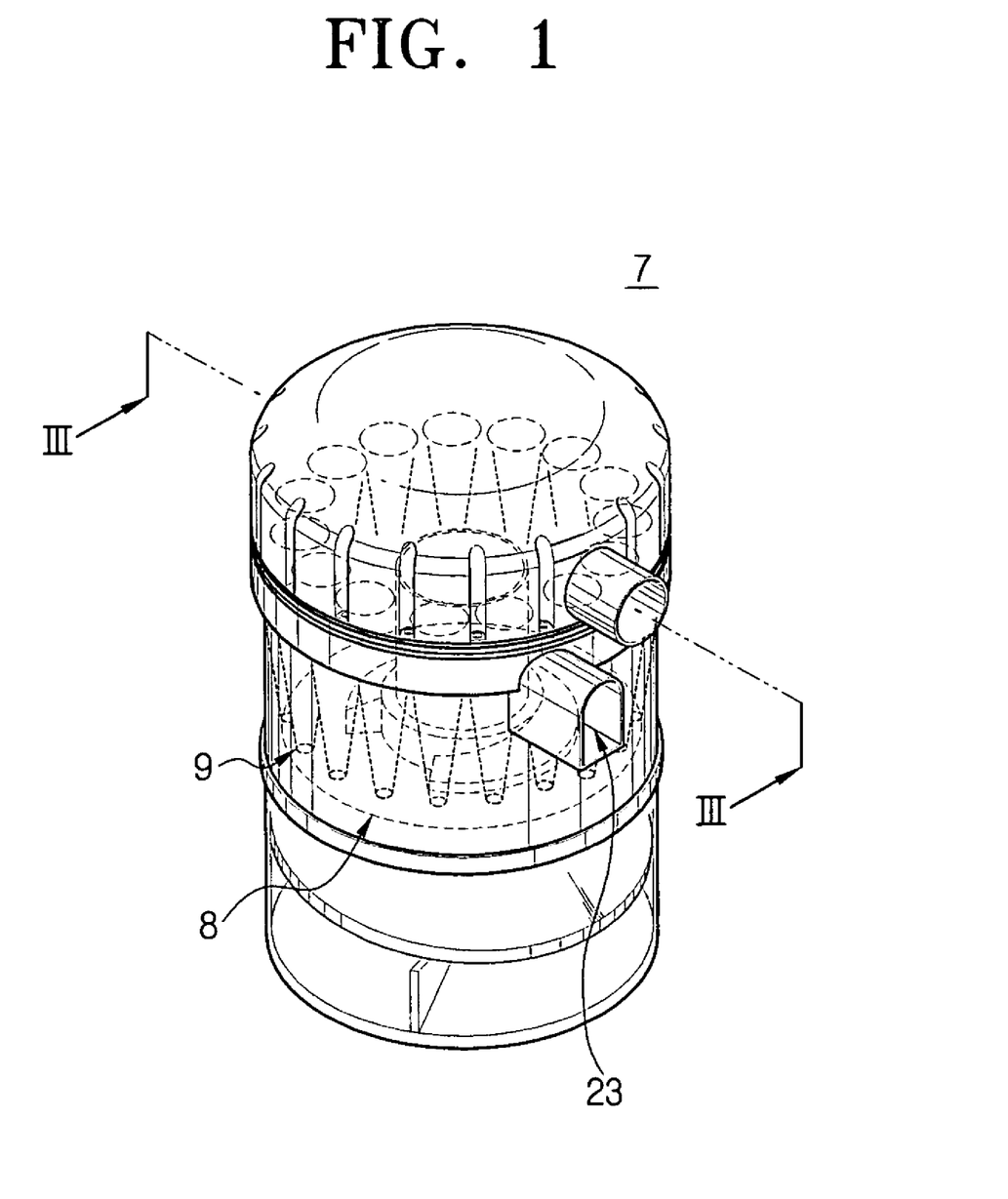
FIG. 1 is a perspective view of a cyclone dust collecting apparatus according to an embodiment of the present invention.
Figure 2:
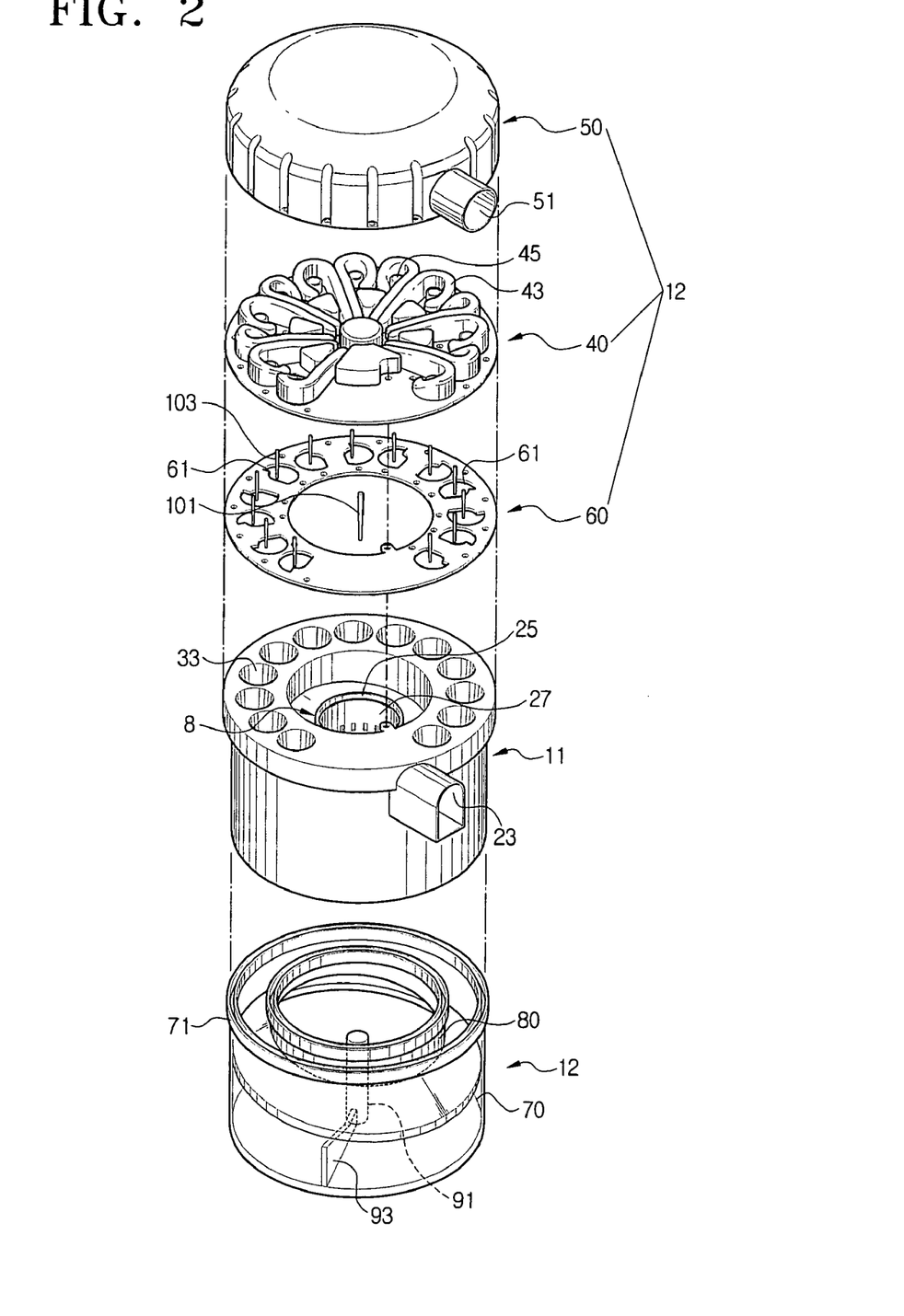
FIG. 2 is an exploded and perspective view of the cyclone dust collecting apparatus of FIG. 1.
Figure 3:
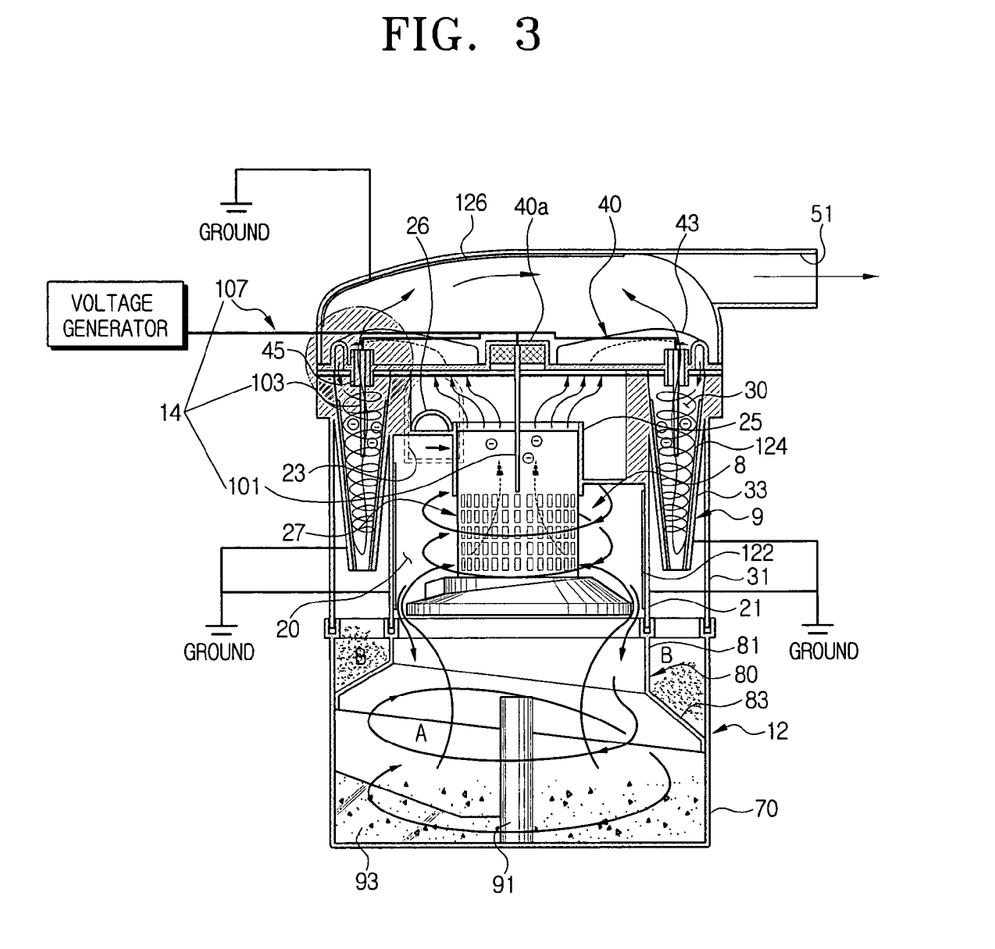
FIG. 3 is a sectional view of the cyclone dust collecting apparatus cut along a line III-III of FIG 1.

Referring to FIGS. 1 through 3, a cyclone dust collecting apparatus 7 according to an embodiment of the present invention is constructed by a multi-cyclone unit 11 comprising a first cyclone 8 and a plurality of second cyclones 9.

The first cyclone 8 is disposed in a center portion of the multi-cyclone unit 11 and comprised by a first discharge path 25, an inner casing 21 constructing a first cyclone body 21 and a suction port 23. The first cyclone 8 separates relatively rough dust from dust-laden air drawn in through the suction port 23.

The second cyclones 9 comprises a centrifugal path 43 formed in a first cover 40, a second discharge path 45, a second cyclone body 33. Thirteen second cyclones 9 are disposed around the first cyclone 8.

Referring to FIGS. 2 and 3, the cyclone dust collecting apparatus comprises the multi-cyclone unit 11, a dust collecting unit 12, a cover unit 13 and an electrode unit 14. FIG. 2 is a perspective exploded view showing respective parts of the cyclone dust collecting apparatus. Regarding the electrode unit 14, only one electrode member is shown in FIG. 2 while the rest of the electrode unit parts are shown in FIG. 3. FIG. 3 is a sectional view of FIG. 1 cut along a line III-III of FIG. 1. In FIG. 3, arrows represent flow of air.

The multi-cyclone unit 11 comprises a first cyclone 8 and the thirteen second cyclone bodies 33 (FIG. 4) disposed on an outer circumference of the first cyclone 8. The first cyclone 8 comprises first cyclone chamber 20 which is an inner space of the inner casing 21 (FIG. 4) having a substantially cylindrical shape, the suction port 23 for drawing air into the first cyclone chamber 20, and a grill member 27 connected to the first discharge path 25 of the inner casing 21. The inner casing 21 may be integrally formed with the outer casing 31. A bottom portion and a top portion of the inner casing 21 are open, and especially, the top portion is open through the first discharge path 25 so that the air can flow in through the second cyclone 9. The grill member 27 is disposed in the first discharge path 25.

The thirteen second cyclones 9 are disposed around the first cyclone 8. The second cyclone body 33 is disposed in a space between the inner casing 21 and the outer casing 31 and formed in a truncated conical shape which is shorter than the inner and the outer casings 21 and 31. The second cyclone body 33 is vertically opened. Therefore, the air generates a swirl from an upper part of the second cyclone body 33 and descends. Then, the air is bounced back to ascend and discharged. During this, relatively fine dust in the air is centrifuged and collected in the dust collecting unit 12, passed through the bottom portion of the second cyclone body 33. Referring to FIG. 2, the second cyclone bodies 33 are disposed at a certain interval in a circumferential direction of the first cyclone 8. The inner and the outer casings 21 and 31, the second cyclone bodies 33 and the suction port 23 can be formed as one body.

The dust collecting unit 12 is detachably connected to a lower part of the multi-cyclone unit 11. The dust collecting unit 12 includes two separate spaces 'A' and 'B' in order to respectively collect the rough dust and the fine dust which are centrifuged by the first and the second cyclones 8 and 9, respectively. The dust collecting unit 12 comprises a main receptacle 70 and an isolation member 80 formed within the main receptacle 70. The main receptacle 70 has the same diameter as the outer casing 31 and includes a connection part 71 for connection with a lower part of the outer casing 31.

The isolation part 80 comprises an isolation member body 81 of a cylindrical form, connected to a lower part of the inner casing 21 and a skirt part 83 extended from a circumferential edge of the isolation member body 81 and connected to an inside of the main receptacle 70. A first space 'A', formed by an inside of the isolation member 80 and a lower space of the main receptacle 70, collects the rough dust separated at the first cyclone 8. A second space 'B' formed between an outside of the isolation member 80 and an upper part of the main receptacle 70 is fluidly communicated with the second cyclone 9. Accordingly, the fine dust separated at the second cyclone 9 is collected in the second space 'B'.

The main receptacle 70 is preferably made of a transparent material for a user to check an amount of the dust collected therein. The skirt part 83 of the isolation member 80 is preferably sloping more at one side, such that the user can check the collected dust more easily when the fine dust is stacked on the more-sloping side of the skirt part 83.

A pole 91 is projected on a bottom of the main receptacle 70 to prevent the dust collected in the first space 'A' from ascending by a whirling air current generated in the first space 'A'. Further, a partition 93 connecting the pole 91 and an inner wall of the main receptacle 70 is provided to restrain the dust stacked in the main receptacle 70 from rotating or moving due to air flow.

The cover unit 13 comprises the first cover 40, a second cover 50 and a gasket 60. The first cover 40 induces the air passed through the first cyclone 8 into the respective second cyclones 9. The first cover 40 is connected to a top portion of the multi-cyclone unit 11, and the gasket 60 is interposed between the first cover 40 and the multi-cyclone unit 11.

Figure 4:
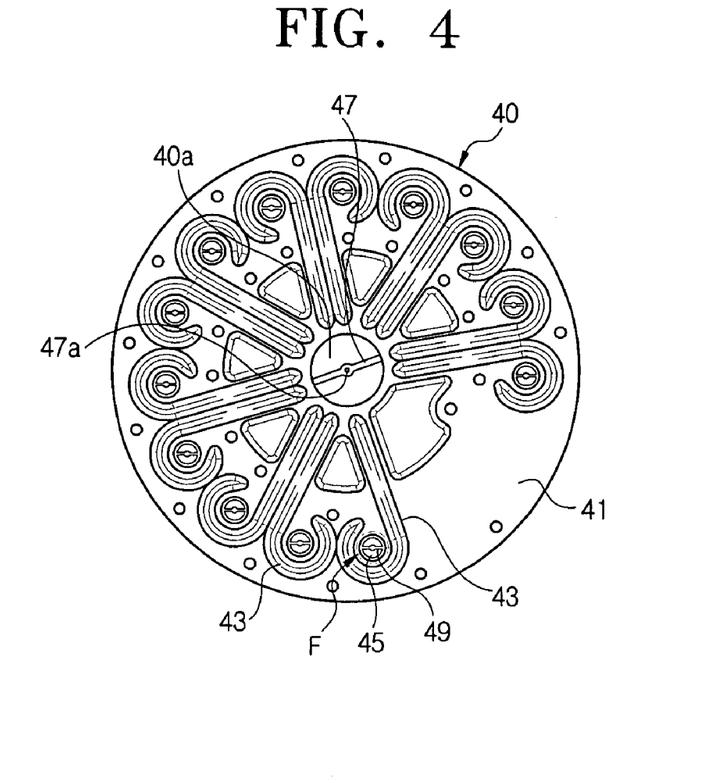
FIG. 4 is a bottom view of a first cover.

As shown in FIG. 4, the first cover 40 comprises a plate body 41, a plurality of the centrifugal paths 43 arranged in a radial direction with respect to a center of the plate body 41, and the second discharge path 45. The centrifugal path 43 guides the air discharged through the first discharge path 25 of the first cyclone chamber 20 toward the upper part of the second cyclone body 33 and thereby turns the discharged air into a swirling air. More specifically, the air passed through the first discharge path 25 and moved up to the upper part of the first cyclone 8 is moved in a radial direction along the centrifugal path 43 toward the second cyclone 9, thereby generating a swirling air. A cleaned air from which the fine dust is separated is moved up again, generating the swirling air in the second cyclone body 33, and discharged through the second discharge path 45. The cleaned air passed through the second discharge path 34 is discharged through a third discharge path 51 of the second cover 50 (FIG. 2).

The second cover 50 (FIG. 2) is disposed above the first cover 40 to collect and discharge to the outside the air discharged from the respective second discharge paths 45. An inner wall of the second cover 50 may be coated with a conductive pigment or provided with a conductive member. The second cover 50 (FIG. 2) is grounded, as shown in FIG. 3.

The gasket 60 seals between the cover 40 and the second cyclone bodies 33 and comprises holes 61 respectively corresponding to the second cyclone bodies 33 so that the air passed through the first cyclone chamber 20 can flow into a second cyclone chamber 30 through the holes 61. The holes 61 guides the air passed through the centrifugal path 43 so as to increase the centrifugal force of the air.

Referring to FIGS. 3 and 4, a first guide member 47 is formed at a center portion 40a of the first cover 40. The first guide member 47 may be separately or integrally formed with respect to an inner wall of the center portion 40a of the first cover 40 across the center portion 40a.

The first guide member 47 has a first mounting hole 47a at a center thereof to mount a first electrode member 101. The first mounting hole 47a has an inner diameter for the first electrode member 101 to tightly fit therein, so that the first electrode member 101 does not easily escape from the first mounting hole 47a.

Figure 5:
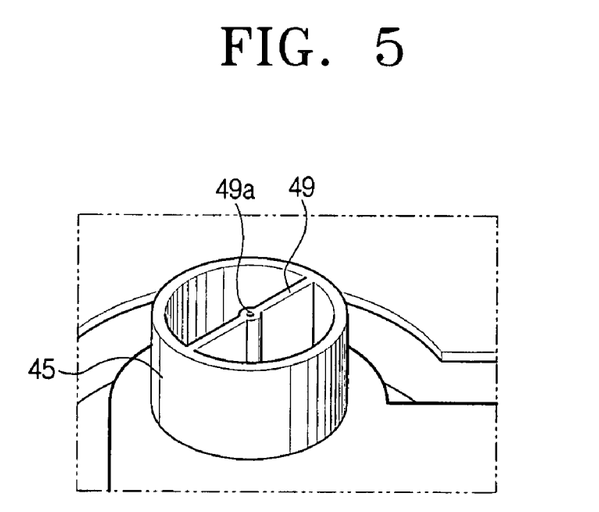
FIG. 5 is an enlarged and perspective view of part 'F' of FIG. 4.

Referring to FIGS. 3 through 5, the second discharge path 45 is projected by a certain length into the second cyclone 9.

The second discharge path 45 has the second guide member 49 which can be separately or integrally formed with respect to an inner wall of the second discharge path 45 across a center portion thereof.

The second guide member 49 has a second mounting hole 49a for mounting a second electrode member 103 at a center thereof. The second mounting hole 49a has an inner diameter for the second electrode member 103 to tightly fit therein, so that the second electrode member 104 does not easily escape from the second mounting hole 49a.

Referring to FIGS. 3 through 5, the electrode unit 14 comprises the first and the second electrode members 101 and 103, and first to third conductive members 122, 124 and 126.

The first electrode member 101 is mounted in the first mounting hole 47a of the first guide member 47. To this end, the first electrode member 101 has a diameter to tightly fit into the first mounting hole 47a of the first guide member 47. In order to maximize generation of negative ions, the first electrode member 101 is configured in a needle form having a certain length. It will be sure understood that the second electrode member 103 may have other various forms.

The second electrode member 103 is mounted in the second mounting hole 49a of the second guide member 49. To this end, the second electrode member 103 has a diameter to tightly fit into the second mounting hole 49a of the second guide member 49. In order to maximize generation of negative ions, the second electrode member 103 is configured in a needle form having a certain length. It will be sure understood that the second electrode member 103 may have other various forms.

The first to third conductive members 122, 124 and 126 are mounted in the inner casing 21 of the multi-cyclone unit 11, in an inner wall of the second cyclone body 33 and in the inner wall of the second cover 50, respectively, and grounded. The first to third conductive member 122, 124 and 126 may be applied by a conductive pigment coated on the inner walls thereof or a conductive member separately provided at the inner walls thereof. In this embodiment, the conductive pigment is applied, as shown in FIG. 3.

Figure 6:
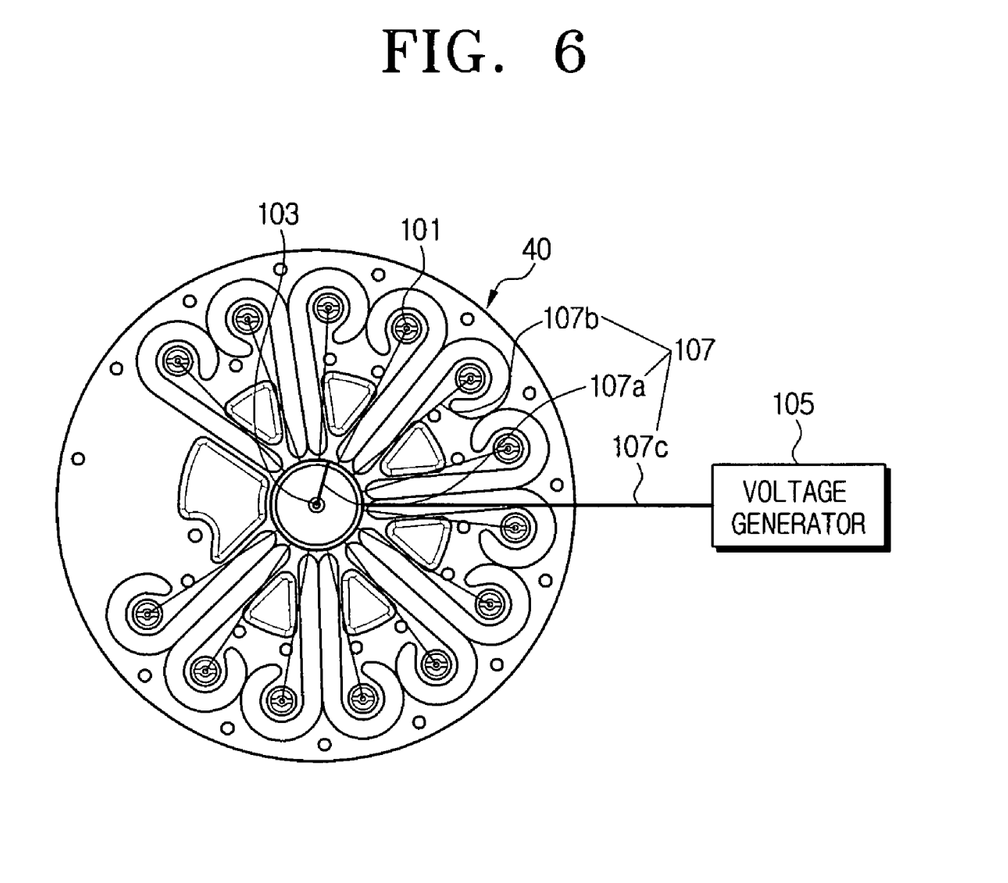
FIG. 6 is a plan view of the first cover of FIG. 2 additionally showing a method for wiring the electrode unit.

Referring to FIG. 6, the first electrode member 101 is connected to a first electric wire 107a at an upper part of the first cover 40 whereas the second electrode member 103 is connected to a plurality of second electric wires 107b at an upper part of the first cover 40. The first and the second electric wires 107a and 107b are connected parallel to each other at the center of the first cover 40 and connected to a voltage generator through a third electric wire 107c. Accordingly, the first and the second electrode members 101 and 103 are applied with the same amount of voltage. The voltage generator may be separately formed from or integrally formed with the cyclone dust collecting apparatus so as to apply high voltage to the first and the second electrode members 101 and 103. The first and the second electrode members 101 and 103 are usually applied with approximately 5 KV to 10 KV.

Hereinbelow, the operation of the cyclone dust collecting apparatus having the above structure will be described.

Referring to FIGS. 1 to 3, dust-laden air is drawn in through the suction port 23. The drawn-in air is guided along an air inducing wall 26 (FIG. 3), thereby turning to a swirling air, and drawn into the first cyclone chamber 20 of the inner casing 21. By the centrifugal force of the swirling air, the rough dust is dropped and collected into the first space 'A' of the main receptacle 70, and the cleaned air is passed through the grill member 27 and discharged through the first discharge path 25. The air ascending after passing through the first discharge path 25 diffuses by collision with the first cover 40 and enters the thirteen second cyclone chambers 30 along the centrifugal path 43. The air drawn into the second cyclone chambers 30 changes to the swirling air, being induced by the centrifugal path 43, and separates the dust still remaining in the second cyclone chamber 30. Accordingly, the dust which is not yet separated at the first cyclone 8 is separated in the respective second cyclones 9 and dropped, and the swirling air is passed through the second discharge path 45 of the first cover 40 and discharged toward the second cover 50. The dust separated and dropped by the second cyclone 9 is collected in the second space 'B'. The air discharged through the second discharge paths 45 of the first cover 40 is discharged out through the third discharge path 51 of the second cover 50.

Setting aside the centrifugal separation of the dust, the fine dust is also separated by the electrode unit 14. The processes for separating the fine dust by the electrode unit 14 will be described as below.

Referring to FIG. 3, when the high voltage is applied to the first and the second electrode members 101 and 103 by the voltage generator 105, a strong magnetic field is generated around the first and the second electrode members 101 and 103, and accordingly, a corona discharge is caused. At this time, air molecules existing around the first and the second electrode members 101 and 103 become negative ions. As the air molecules which became the negative ions collide with the dust drawn into the first and the second cyclone chambers 20 and 30, the dust is charged with negative electricity.

The dust charged with the negative electricity is attached to the first and the second conductive members 122 and 124 which are mounted or applied on the inner walls of the first cyclone 8 and the second cyclone bodies 33, by a voltage difference. As the attached dust increases to a certain amount, the attached dust is stacked on the inner walls of the inner casing 21 and the second cyclone bodies 33 and dropped into the first and the second spaces 'A' and 'B' of the main receptacle 70. Additionally, the dust remaining in the cleaned air which has passed through the second cyclone chamber 30 is attached to the third conducive member 126 mounted on the inner wall of the second cover 50, thereby being secondarily separated.

As can be appreciated from the above description of the cyclone dust collecting apparatus according to an embodiment of the present invention, although the dust is not perfectly separated by the centrifugal force, the fine dust can be secondarily separated by electricity. Accordingly, the dust-collecting efficiency of the cyclone dust collecting apparatus is improved.

While the invention has been shown and described with reference to certain embodiments thereof, it will be understood by those skilled in the art that various changes in form and details may be made therein without departing from the spirit and scope of the invention as defined by the appended claims.

What is claimed is:

1. A cyclone dust collecting apparatus comprising:
a first cyclone for centrifuging dust from drawn-in air;
one or more second cyclones for separating dust from air which is passed through the first cyclone;
a cover unit connecting the first and the second cyclones; and
an electrode unit mounted to at least one of the first and the second cyclones, wherein the electrode unit comprises a first electrode mounted in a first discharge path of the first cyclone and a first conductive member mounted to an inner wall of the first cyclone.

2. The cyclone dust collecting apparatus of claim 1, wherein the electrode unit comprises a second electrode mounted in a second discharge path of the second cyclone, and a second conductive member mounted to an inner wall of the second cyclone.

3. The cyclone dust collecting apparatus of claim 2, wherein the first and the second electrode members generate negative ions so that the dust included in the air is charged with negative electricity, and the first and the second conductive members are grounded.

4. A cyclone dust collecting apparatus comprising:
a multi-cyclone unit including a first cyclone chamber for separating dust from drawn-in air and a plurality of second cyclone chambers formed around the first cyclone chamber;
a cover unit mounted to a top portion of the multi-cyclone unit to connect the first and the second cyclone chambers;
a dust collecting unit mounted to a bottom portion of the multi-cyclone unit to collect centrifuged dust; and
an electrode unit for charging the dust drawn into at least one of the first and the second cyclone chambers.

5. The cyclone dust collecting apparatus of claim 4, wherein the cover unit comprises a first cover having centrifugal paths for guiding the air, passed through the first cyclone chamber, to the second cyclone chamber in swirling manner and a second cover for guiding the air discharged from the second cyclone, and the electrode unit comprises at least one electrode members and at least one conductive members.

6. The cyclone dust collecting apparatus of claim 5, wherein the electrode member comprises a first electrode member mounted to the first cover and projected into the first cyclone chamber and a plurality of second electrode members projected into the second cyclone chamber, and the conductive member comprises a first conductive member mounted to an inner wall of the cyclone body and a plurality of second conductive members mounted to inner walls of the plurality of second cyclone bodies.

7. The cyclone dust collecting apparatus of claim 6, wherein the conductive member further comprises a third conductive member mounted on an inner wall of the first cover.

8. The cyclone dust collecting apparatus of claim 6, wherein the first cover comprises first and second guide members mounted in first and second discharge paths, and the first electrode member and the plurality of second electrode members are mounted to the first and the second guide members.

9. The cyclone dust collecting apparatus of claim 8, wherein the first and the second guide members respectively have mounting holes for inserting therein the first electrode member and the plurality of second electrode members.

10. The cyclone dust collecting apparatus of claim 6, wherein the first electrode member and the plurality of second electrode members generate negative ions, and the first conductive member and the plurality of second conductive members are grounded.

11. The cyclone dust collecting apparatus of claim 6, wherein the first electrode member and the plurality of second electrode members are configured in a needle form.

12. The cyclone dust collecting apparatus of claim 6, wherein the plurality of second electrode members are connected parallel one another so as to be respectively applied with the same voltage.

13. A cyclone dust collecting apparatus comprising:
a plurality of cyclones for separating dust from drawn-in air by the centrifugal force;
a cover unit connecting the plurality of cyclones; and
a second device for separating dust from the drawn-in air by electricity, wherein the second device comprises an electrode unit having an electrode in a path of the drawn-in air and a conductive member on an inner wall of at least one of the plurality of cyclones and wherein the conductive member comprises conductive pigment coated on the inner wall.

* * * * *